United States Patent [19]

Cornils et al.

[11] Patent Number: 4,511,439
[45] Date of Patent: Apr. 16, 1985

[54] SOLAR-SELECTIVE LAYERS AND METHOD FOR PRODUCING SAME

[75] Inventors: Boy Cornils, Dinslaken; Jürgen Weber; Béla Tihanyi, both of Oberhausen; Werner DeWin, Dinslaken, all of Fed. Rep. of Germany

[73] Assignees: Ruhrchemie Aktiengesellschaft; M.A.N. Maschinenfabrik Augsburgnurnberg Aktiengesellschaft, both of Fed. Rep. of Germany

[21] Appl. No.: 427,094

[22] Filed: Sep. 29, 1982

[30] Foreign Application Priority Data

Mar. 20, 1982 [DE] Fed. Rep. of Germany ....... 3210367

[51] Int. Cl.$^3$ .............................. C25D 5/54; F24J 3/02
[52] U.S. Cl. .................................. 204/37.1; 204/38.1; 126/417; 126/901; 148/6.3
[58] Field of Search ................. 126/901, 417; 148/6.3; 204/37 R, 38 R

[56] References Cited

U.S. PATENT DOCUMENTS

| 31,339 | 8/1883 | Dardi et al. | 204/37 R |
| 3,944,440 | 3/1976 | Franz | 148/6.3 |
| 4,104,134 | 8/1978 | Roberts et al. | 204/37.1 |
| 4,119,761 | 10/1978 | Kuze et al. | 148/6.3 |
| 4,189,331 | 2/1980 | Roy | 126/901 |
| 4,228,220 | 10/1980 | Garrison | 204/37 R |
| 4,235,226 | 11/1980 | Scherber et al. | 126/901 |
| 4,239,604 | 12/1980 | Mahdjuri | 126/901 |
| 4,392,920 | 7/1983 | McDonald | 204/37 R |

FOREIGN PATENT DOCUMENTS

| 2843571 | 4/1980 | Fed. Rep. of Germany | 126/901 |
| 31806352 | 12/1981 | Fed. Rep. of Germany | 126/901 |
| 153348 | 12/1979 | Japan | 148/6.3 |

OTHER PUBLICATIONS

Longland, "Selecting a Finish for Solar Heating Panels", Finishing Industries, vol. 2, No. 11, Nov. 1978.

*Primary Examiner*—Howard S. Williams
*Assistant Examiner*—Terryence Chapman
*Attorney, Agent, or Firm*—Jordan B. Bierman

[57] ABSTRACT

An improved solar-selective layer and method for producing the same on suitable substrates is discussed. In accordance with this invention, a metal layer is first of all deposited on a suitable substrate of a collector and is then oxidized at elevated temperature and pressure.

8 Claims, No Drawings

SOLAR-SELECTIVE LAYERS AND METHOD FOR PRODUCING SAME

The present invention relates to solar-selective layers and a method for producing such layers on suitable substrates for converting solar radiation into thermal energy.

The utilization of solar radiation in order to produce thermal energy is becoming increasingly important. To achieve this objective a whole range of apparatuses are known which are designed for different temperature ranges according to the field of application.

The conversion of solar energy into heat can be carried out corresponding to the desired temperature levels with flat or concentrating collectors. The nonreflected, visible spectrum in the solar radiation is absorbed by black layers on the surface of the collectors and converted into thermal energy. The temperature of the converter surface increases during the conversion and the converter reradiates to the surrounding energy of higher wavelengths than it absorbed.

In conventional coatings, e.g. black lacquers, the surface not only absorbs, but also emits thermal radiation to a large extent. For collectors with a low temperature level, i.e., below 100° C., the energy gain is satisfactory despite this strong emission. However, for concentrating collector systems with a higher temperature level, the efficiency of lacquer coatings is unsatisfactory.

In order to meet the economic requirements in the temperature range above 200° C. with a satisfactory system, it is necessary to use coatings which not only absorb solar radiation well, but at the same time emit a minimal amount of thermal radiation (infrared radiation). Layers of high absorption ($\alpha$) and low emission ($\epsilon$) are termed selective. $\alpha$ should be greater than or equal to 0.85, and $\epsilon$ less than or equal to 0.25. The greater the $\alpha$ and the smaller the $\epsilon$, the better the selectivity, i.e., the quotient $\alpha/\epsilon$ of the surface.

It is also desirable to operate at the highest possible temperatures since for many purposes high temperatures permit a better utilization of the trapped energy.

The production of solar-selective layers is known. They may be produced by various techniques, e.g., by depositing solids such as metals, by thermal decomposition of gaseous substances on substrate surfaces (chemical vapor deposition), by atomization of solids, or electrochemically. The layers are mainly present as metal oxides, which are obtained either by depositing the metals in an oxidizing atmosphere or by subsequent oxidation of a metal layer deposited in a nonoxidizing atmosphere. The oxidation may be carried out e.g. with chromic acid, hydrogen peroxide or oxygen-containing gases at elevated temperature and under normal pressure (see e.g. van der Leij: Sun, New York 1978, pp. 837–841).

In addition, absorbers that are obtained by oxidizing the collector are also used. Examples of such coatings are oxidized copper, aluminum or steel substrates. Although they are of course black, they are often insufficiently selective and frequently exhibit a low adhesion capacity.

An objective has accordingly existed of producing absorber layers of the highest possible selectivity, which are also thermally stable in elevated temperature ranges and do not have the defects of the presently known layers.

According to the present invention, this objective is achieved by a method for producing solar-selective layers suitable for converting solar radiation into thermal energy by means of a metal oxide layer deposited on the surface of the converter. The method is characterized in that a metal layer is first of all deposited on the converter and is then oxidized under pressure and at elevated temperature.

The new method is suitable for producing solar-active layers from all metals which can be used for this purpose according to the state of the art. Particularly suitable are cobalt and/or nickel, as well as chromium, tungsten and molybdenum. Normally, the thickness of the metal layers on the substrate is less than 10 $\mu$m, in particular to 0.3 to 3.0 $\mu$m. The production of metal layers by electrolytic deposition has proved particularly effective.

The oxidation of the metal layer applied to the substrate is carried out according to the new procedure under pressure with an oxidizing agent that is gaseous under the reaction conditions. Such agents include oxygen and oxygen-containing gas mixtures as well as those gases which, at the temperature employed, act as oxidizing agents with respect to the metals deposited on the substrate. Such gases include sulphur dioxide, sulphur trioxide and nitrogen oxides.

The oxidation of the metal layer is carried out at temperatures between 100° and 400° C. and preferably at pressures between 50 and 250 bars.

The new method is preferably carried out in pressure apparatus adapted to the shape of the coated body, for example pressure tubes or autoclaves. Tubular converters, which are frequently used in solar technology, can be oxidized in a pressure tube that is installed for one or more of these tubular converters. The oxidizing gas can be fed in from one or several points. At low reaction rates, it is advantageous to circulate the oxidizing gas.

The new method surprisingly provides solar-selective layers of high selectivity. In general, it is true that the selectivity of the layers is raised by carrying out the oxidation under increasing pressure and increasing temperature. In addition, the layers also have an excellent adhesion strength.

The method according to the invention is illustrated in more detail in the following Examples. The results of the tests are summarized in Tables 1 and 2.

EXAMPLES 1 TO 3

The 0.3–0.5 $\mu$m thick nickel layer deposited electrochemically from nickel citrate onto a ST 37 steel test body nickel plated with a 5$\mu$ thick shiny nickel layer and which serves as substrate, is oxidized with air or $O_2$ in an autoclave at different temperatures and pressures. The treatment time is in each case 24 hours.

EXAMPLE 4 (COMPARISON)

This Example describes the properties of a nickel layer which has been produced according to Examples 1 to 3 but has not been oxidized.

EXAMPLE 5 (COMPARISON)

This Example describes the properties of a nickel layer which has also been produced according to Examples 1 to 3, but in which, in contrast to these tests, the oxidation is carried out not under pressure in a rotary air furnace.

The experimental conditions and results of Examples 1 to 5 are summarized in Table 1.

EXAMPLES 6 AND 7

The 0.3-0.5 μm thick nickel layer deposited electrochemically from cobalt citrate onto a ST 37 steel test body nickel-plated with a 5μ thick shiny nickel layer and which serves as substrate, is oxidized with air or $O_2$ in an autoclave at different temperatures and pressures. The treatment time is in each case 24 hours.

EXAMPLE 8 (COMPARISON)

This Example describes the properties of a cobalt layer which is produced according to Examples 6 and 7 but is not oxidized.

EXAMPLE 9 (COMPARISON)

This Example describes the properties of a cobalt layer which is likewise produced according to Examples 6 and 7 but in which, in contrast to these tests, the oxidation is carried out not under pressure in a rotary air furnace.

The experimental conditions and results are summarized in Table 2.

TABLE 1

Dependence of $\alpha$ and $\epsilon$ on the oxidation parameters in Ni layers

|  | Example 1 | Example 2 | Example 3 | Example 4 | Example 5 (comparison) |
|---|---|---|---|---|---|
| Temperature (°C.) | 150 | 235 | 280 | — | 400 |
| Pressure (bars) | 150 | 200 | 100 | — | — |
| Oxidation medium | Air | $O_2$ | $O_2$ | — | Air |
| $\alpha$ | 0.97 | 0.97 | 0.96 | 0.94 | 0.94-0.96 |
| $\epsilon$ | 0.26 | 0.22 | 0.18 | 0.29 | 0.32-0.47 |

TABLE 2

Dependence of $\alpha$ and $\epsilon$ on the oxidation parameters in Co layers

|  | Example 6 | Example 7 | Example 8 | Example 9 |
|---|---|---|---|---|
| Temperature (°C.) | 235 | 280 | — | 400 |
| Pressure (bars) | 200 | 100 | — | — |
| Oxidation medium | Air | $O_2$ | — | Air/$O_2$ |
| $\alpha$ | 0.97 | 0.96 | 0.95 | 0.95 |
| $\epsilon$ | 0.15 | 0.11 | 0.21 | 0.20 |

Keeping in mind, as previously stated, that the layer of high absorbtion ($\alpha$) should be greater than or equal to 0.85, and the layer of low emission ($\epsilon$) should be less than or equal to 0.25, it will be noted from Table 1 that at high temperatures at 100 or more bars utilizing oxygen as the oxidation medium the desired parameters for Ni layers are fully met, while satisfactory results can be obtained by air as in Example 1. However, without oxidation as in Example 4 and without pressure in Example 5, the desired results have not been obtained, in both cases the low emission figure being too high.

In the examples using cobalt in Table 2, it can be seen that under conditions of high temperature and pressure both the absorbtion and emission factors are excellent, falling off in the absence of high temperature and pressure.

It is, therefore, clear that solar-selective layers of greatly improved absorption and emission characteristics can be provided for converting solar radiation into thermal energy. The invention is not intended to be limited to the specific forms above discussed, but only as required by the claims which follow.

We claim:

1. A method for producing solar-selective layers on a converter for converting solar radiation into thermal energy by means of a metal oxide layer applied to the surface of said converter which includes the steps of depositing a metal layer on the surface of said converter and then oxidizing said layer at a temperature of between 100° C. and 400° C. and a pressure of between 50 and 250 bars.

2. Method according to claim 1 in which the oxidizing is effected with an oxidizing gas.

3. Method according to claim 1 in which the oxidizing is effected with an oxidizing gas mixture.

4. Method according to claim 1 in which the oxidizing is effected with pure oxygen.

5. Method according to claim 1 in which said metal layer is chosen from the group of nickel or cobalt.

6. Method according to claim 1 in which said metal layer is electrolytically deposited.

7. In an apparatus for converting solar energy into heat, in which a converter is provided with a heat-absorbing surface, the improvement comprising a metal layer deposited on said surface, said layer having been oxidized at temperatures between 100° C. and 400° C. and pressure of between 50 and 250 bars.

8. An apparatus according to claim 7 in which said metal layer is chosen from the group of nickel or cobalt.

* * * * *